(12) United States Patent
Hamberg (10) Patent No.: US 7,149,542 B2
(45) Date of Patent: *Dec. 12, 2006

(54) METHOD AND NETWORK ELEMENT FOR CONNECTING A SUBSCRIBER TO A CELLULAR TELECOMMUNICATION NETWORK

(75) Inventor: Max Hamberg, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/226,699

(22) Filed: Sep. 14, 2005

(65) Prior Publication Data

US 2006/0025174 A1    Feb. 2, 2006

Related U.S. Application Data

(63) Continuation of application No. 09/719,070, filed as application No. PCT/FI99/00562 on Jun. 24, 1999, now Pat. No. 6,973,329.

(30) Foreign Application Priority Data

Jun. 24, 1998   (FI)   ..................... 981450

(51) Int. Cl.
*H04M 1/00*   (2006.01)

(52) U.S. Cl. ............... 455/554.2; 455/432.2; 455/432.3; 455/555; 379/220.01

(58) Field of Classification Search ............ 455/554.2, 455/432.2, 432.3, 555, 426.1, 433, 435.1, 455/461, 461.2; 370/310.2, 385; 379/220.01, 379/220.02

See application file for complete search history.

(56) References Cited

U.S. PATENT DOCUMENTS

| | | |
|---|---|---|
| 5,592,533 A | 1/1997 | McHenry et al. |
| 5,666,399 A | 9/1997 | Bales et al. |
| 5,734,981 A | 3/1998 | Kennedy, III et al. |
| 5,745,852 A | 4/1998 | Khan et al. |
| 5,771,275 A | 6/1998 | Brunner et al. |
| 5,901,359 A | 5/1999 | Malmstrom |
| 6,122,508 A | 9/2000 | Veloso |
| 6,973,329 B1 * | 12/2005 | Hamberg ................ 455/554.2 |

FOREIGN PATENT DOCUMENTS

| | | |
|---|---|---|
| EP | 0 779 757 | 6/1997 |
| EP | 0 647 074 | 5/1999 |

(Continued)

OTHER PUBLICATIONS

"Translation of the Official Action dated Jun. 16, 1999" from the Finnish Patent Office, corresponding to Finnish Patent Application No. FI 981450.

*Primary Examiner*—Steve M. D'Agosta
(74) *Attorney, Agent, or Firm*—Cohen, Pontani, Lieberman & Pavane (57) ABSTRACT

A method and apparatus for connecting a subscriber apparatus or subscriber's network to a mobile network, wherein a network element is placed between a mobile network and a subscriber apparatus or subscriber's network. The network element emulates the appropriate interface towards both the mobile network and a subscriber apparatus or subscriber's network that are attached to the network element. The network element is assigned the task to switch and, if necessary, concentrate calls between the mobile network and subscriber's network. In addition, the network element advantageously comprises a database block that stores the subscriber data needed by the mobile network, which data correspond to subscriber apparatus in the subscriber's network connected to the mobile network.

22 Claims, 7 Drawing Sheets

FOREIGN PATENT DOCUMENTS

| WO | WO 95/33348 | 12/1995 |
| WO | WO 96121327 | 7/1996 |
| WO | WO 97/16936 | 5/1997 |
| WO | WO 97/34437 | 9/1997 |

* cited by examiner

METHOD AND NETWORK ELEMENT FOR CONNECTING A SUBSCRIBER TO A CELLULAR TELECOMMUNICATION NETWORK

CROSS-REFERENCE TO RELATED APPLICATIONS

The present application is a continuation application under 35 U.S.C. §120 of U.S. patent Ser. No. 09/719,070, filed Dec. 2, 2000, now U.S. Pat. No. 6,973,329 which was the U.S. national stage under 35 U.S.C. §371 of International PCT Patent Application PCT/FI99/00562, filed on Jun. 24, 1999, which claimed priority from Finnish Patent Application No. 981450, filed on Jun. 24, 1998. Priority is claimed under 35 U.S.C. §119(a), 35 U.S.C. §120, and 35 U.S.C. §365(b) from the aforesaid Finnish and U.S. patent applications. All of the aforesaid patent applications are incorporated by reference in their entirety.

BACKGROUND OF THE INVENTION

1. Field of the Invention

The invention relates to a method and network element for connecting subscriber apparatus, such as conventional subscriber apparatus of a fixed telephone network, to a mobile network. The invention is advantageously applied to a GSM network, for example.

2. Description of the Related Art

A prior-art solution is disclosed in patent EP-779 757. Said document discloses a solution in which the users of a fixed telephone network are offered an arrangement where the users of fixed subscriber apparatus can obtain the same services as the users of a mobile network. The patent discloses a method in which a SIM card can be placed in a fixed subscriber apparatus. By means of the SIM card the fixed subscriber apparatus can be connected to a mobile switching center whereby the subscriber's subscriber data can be stored in a visitor location register.

However, the invention disclosed in said EP-779 757 has some drawbacks. In the solution according to the invention disclosed in EP-779 757, the user has to acquire a new subscriber apparatus in order to have access to the mobile network services. This is due to the fact that the access to the mobile network services is in said invention based on the presence of a SIM card in the subscriber apparatus. The cost of new subscriber equipment will be paid direct by the end user. Moreover, in the arrangement disclosed in said publication only fixed subscriber apparatus can be attached to the mobile network.

SUMMARY OF THE INVENTION

An object of this invention is to make possible the connection of various subscriber apparatus, such as conventional telephones, to a mobile network.

Another object of this invention is to make possible the connection of fixed telephone networks to a mobile network.

Yet another object of this invention is to make possible the connection to a mobile network of radio communication networks different from the mobile network serving as the host network.

These and other objects of the invention are achieved by a separate network element connected to a mobile network such that the subscriber apparatus, telephone network or other entity, which is to be connected to the host network, is connected to said network element. Towards the host network the network element emulates the desired host network interface or apparatus and towards the subscriber apparatus or network to be connected to the host network the network element emulates the service entity or interface required by the subscriber apparatus. Advantageously the network element comprises a memory element storing the additional information possibly needed in the different emulations.

The method according to the invention is characterized by what is expressed in the independent claim directed to the method. The network element according to the invention is characterized by what is expressed in the independent claim directed to the network element. Other preferred embodiments of the invention are presented in the dependent claims.

By means of a separate network element connected to a mobile network it is possible to provide the users of a subscriber's network, such as a fixed telephone network, with the services of the subscriber's network through a mobile network. In a preferred embodiment of the invention the network element is designed to function in such a manner that the mobile network regards the subscriber's network or a subscriber apparatus in the subscriber's network as an element or elements belonging to the mobile network. The operation of the network element is such that it emulates at least one mobile network element towards the mobile network. Conversely, towards the subscriber apparatus the network element emulates the subscriber's network in question, thus producing the signals typical of the subscriber's network.

An advantage of the invention is that by means of the network element according to the invention a given network can be connected to a mobile network. Such a network may be an interphone network, for example. An especially advantageous arrangement can be achieved in the case of sparsely populated areas, wherein a population center can be advantageously connected to the fixed telephone network through a mobile network. Costs will be saved by the fact that there is no need to bring the fixed telephone network to the sparsely populated area over a long distance but calls can be placed using radio waves. The end user will also save costs as current low-cost subscriber apparatus, such as conventional phones, are very well suited to be used in connection with the network element. Moreover, comparing the acquisition cost of the network element and possible fixed subscriber apparatus with the cost of a mobile communications device, it can be seen that the cost of the network element and fixed subscriber apparatus is lower because of the rather simple technology used in them. Especially if the network element is purchased jointly by a population center, for example, telephone connections can be produced at very low costs. In addition to the fixed telephone network the above can be applied to other networks as well.

Another advantage of the invention is that the use of such a network element saves resources. For example in the case of a fixed network the resources of the telephone network of a given area must be dimensioned in accordance with all the fixed subscriber apparatus used in the area. Similarly 7 the resources of a mobile network in the same area need to be dimensioned according to all mobile communication devices existing in and possibly visiting the area. By means of a network element according to a preferred embodiment of the invention it is possible to combine the services of the fixed telephone network and the mobile network so that the total capacity for the switching center of a given area can be dimensioned according to the combined need which is smaller than the sum of the capacities needed for separate networks. This can be generalized to apply to all separate telephone networks in which the network element can be used.

A third advantage of the invention is that by means of an apparatus according to the invention an end user of a fixed telephone network can be offered a familiar fixed subscriber apparatus for connecting to the network. In spite of the fact that mobile communication devices are made more and more user-friendly there are still people who find these apparatus intimidating and esoteric and dare not or know not how to use them. Elderly people in particular find mobile communication devices too difficult to use. People say among other things that these devices have too many and too small pushbuttons. It is just therefore that people would like to use their familiar fixed telephone apparatus everywhere say at the summer house for example, and indeed the present invention provides a good solution for this.

As far as the mobile network operator is concerned, the network element offers new ways of providing services. At present an operator concentrating on mobile communications can only offer a mobile subscription with the associated services to a customer. With the new network element the operator can also offer simple and conventional telephone subscriptions in addition to other subscriptions and various services associated with them. This results in competition on the market as regards the provision and providers of different telephone subscriptions, which usually is good for the customer.

Furthermore, an operator may provide the customer with a phone number that looks like a phone number of a fixed telephone subscription. In that case the subscriber's telephone subscription as regards both the telephone apparatus and phone number looks like a conventional fixed telephone network subscription. By means of a phone number that looks like a phone number of a fixed subscription it is possible to eliminate the problem caused by the fact that many people are afraid to call a mobile phone, fearing, among other things, that it will be expensive. An operator could e.g. make a contract with a local phone company for the use of phone numbers resembling fixed subscriber's numbers in subscriber apparatus connected to the network element or otherwise manage the use of phone numbers typical of that particular area.

The network element according to the invention makes it possible to transport the user's subscriber identity from a mobile communication device to the network element whereby the subscriber apparatus connected to the network element functions as a user terminal. The user may also transport the subscriber identity in the opposite direction, i.e. transfer the subscriber data corresponding to the subscriber apparatus to a SIM card, and continue using the telephone subscription through a mobile communication device. Thus the network element according to the invention facilitates the addition of mobility to fixed telephone networks as well as location updates from a fixed subscriber terminal to a mobile communication device and vice-versa, and from a fixed subscriber terminal to a second fixed subscriber terminal.

By means of the network element according to the invention the user of a fixed subscriber apparatus can be offered all services of a modern digital wire network. Typically, there are digital wire networks only in big cities at present. By means of the network element all these services can be offered to people living in sparsely populated areas as well. Typical services in a digital wire network include call transfer and answering services, for example. There are other services, too. Moreover, considering that the network element uses a mobile network, the user of the network element can be provided with all the mobile network services that can be controlled using the pushbuttons of a fixed subscriber apparatus.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described in more detail with reference to the preferred embodiments presented by way of example and to the accompanying drawings wherein like reference numerals denote similar elements.

DETAILED DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
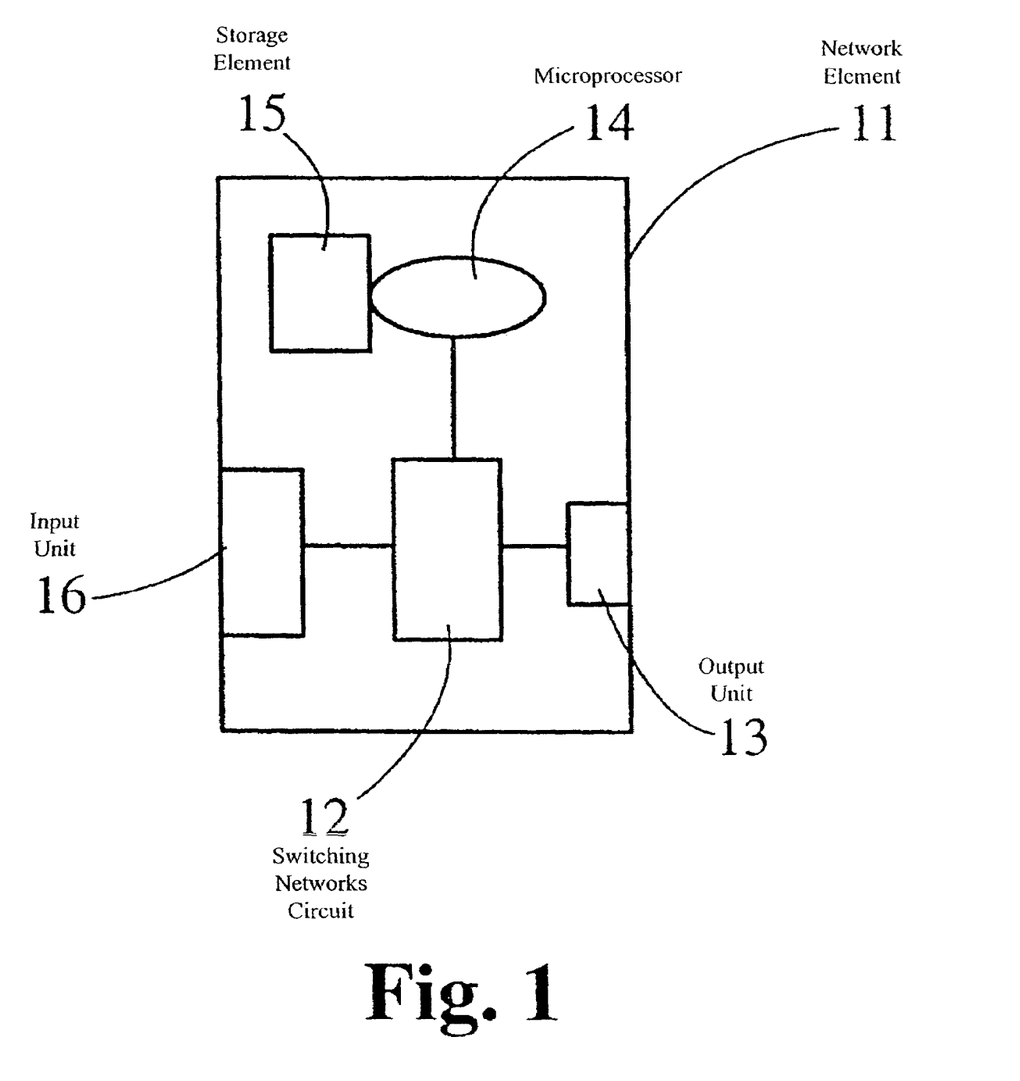
FIG. 1 shows an embodiment of the network element according to the invention.

FIG. 1 illustrates an embodiment of the network element 11 according to the invention.

The network element 11 may be placed advantageously between two different networks, such as a mobile network and fixed telephone network, to emulate a suitable interface for each network. The emulation may be advantageously realized using a microprocessor 14, for example, which has been programmed so as to produce at least the signals required by each network connected to the network element 11.

The network element 11 may comprise in addition to the emulation block, such as a microprocessor 14, a switching block 12, such as a switching network circuit 12, input unit 16 and output unit 13. The function of the input unit 16 is to provide the necessary interface or interfaces at the input side of the network element and, conversely, the function of the output unit 13 is to provide the necessary interface or interfaces at the output side of the network element. For example, in an embodiment of the invention the input unit may comprise one or more analog line interface cards (LIA). The function of the switching network circuit 12 is advantageously at least to switch speech signals and, thus, telephone calls.

'Switching' may here also mean that while there may be a great number of subscriber apparatus connected to the input unit 16 of the network element 11, the network element 11 would still be able to connect the calls, utilizing prior-art technology, to the outlets of the output unit 13, i.e. to the mobile network signal lines connected to the output unit of which there may be less than there are inlets at the input side, i.e. signal lines in the system connected to the mobile network. In this case, the mobile network signal lines may be e.g. speech channels of the mobile network. 'Input side' here refers to that side 35 of the network element 11 which is not connected to the host network and, conversely, 'output side' refers to the side connected to the host network. So, in addition to or in parallel with switching functions the network element may include concentrating functions as well.

In this description, 'host network' refers to the mobile network or its part, such as a core network (CN), to which the entity to be connected, which typically is smaller than the mobile network, is to be connected by means of the network element 11. In addition to the components mentioned above the network element 11 may include at least a database block 15 to provide a database by means of which a subscriber apparatus connected to the network element 11 can be advantageously identified.

For example, if the host network is a GSM network, the subscriber data corresponding to the information in the SIM card, i.e. the data or at least part of the data corresponding to the subscriber data of the host network, can be stored in said database or storage element 15. The database 15 may be stored e.g. in a memory circuit or other storage element. The database can preferably be used for storing data required by the host network, which data cannot be obtained from apparatus 15 connected through the network element 11. It is obvious to a person skilled in the art that the storing of the data corresponding to the database 15 in the network element 11 can be realized in other ways, too. In a preferred embodiment the network element 11 may be realized e.g. in such a manner that the data corresponding to the database 15 may be stored in a system located in the network operator's premises 20 from which place the data can be read when necessary. However, the practicability of such an arrangement can be questioned as it would load the network unnecessarily due to increased signal traffic. Centralization of subscriber data in a single database would, however, bring with it the advantages typically associated with centralization.

Figure 2:
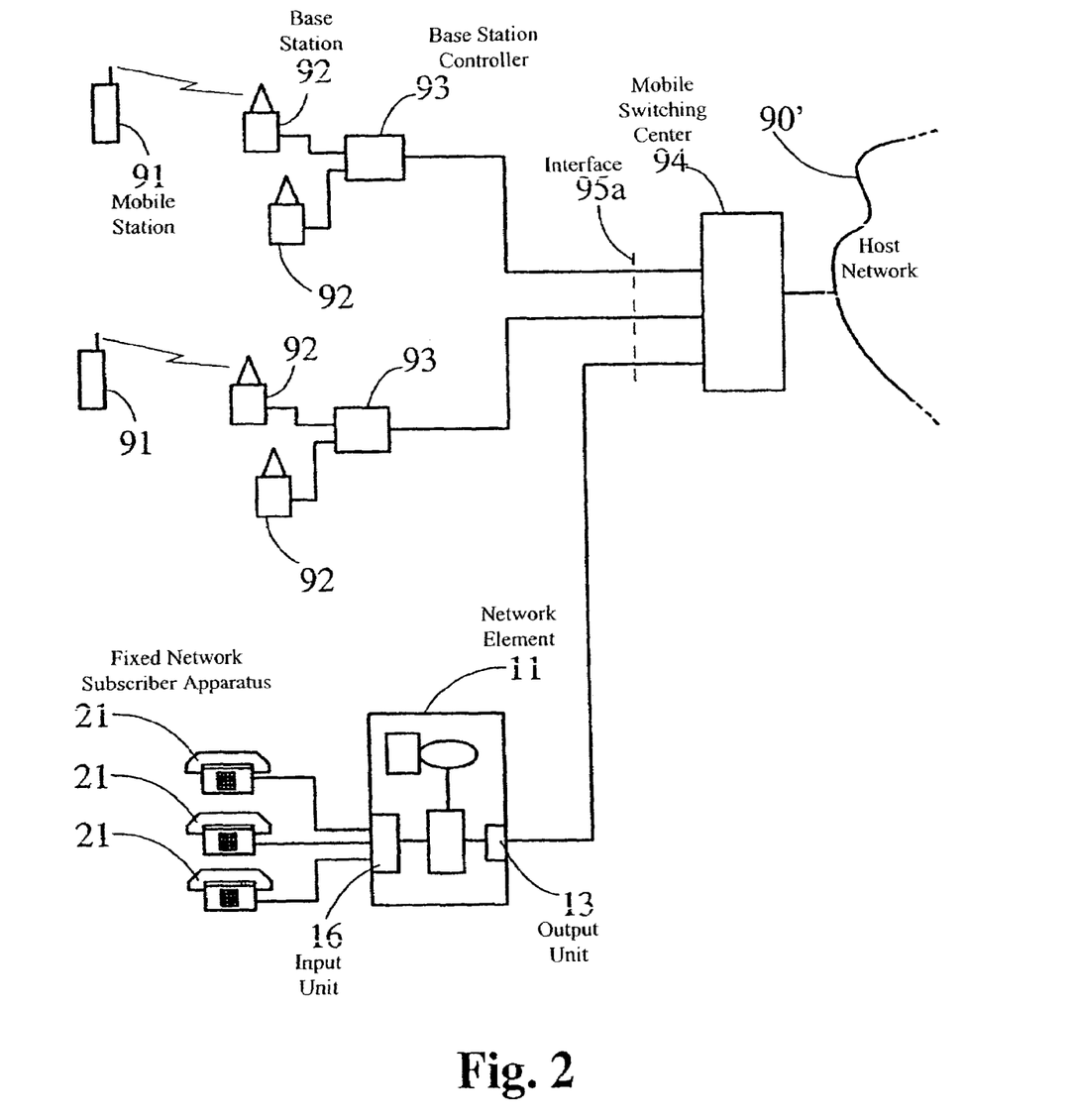
FIG. 2 shows an embodiment of the network element according to the invention, wherein conventional fixed subscriber apparatus are connected to the input side of the network element.

In an embodiment according to the invention it is possible to connect conventional fixed network subscriber apparatus 21 to the input side 16 of the network element 11. An example of such an arrangement is shown in FIG. 2. In such an embodiment the system to be connected to the host network through the network element may comprise e.g. conventional telephones only, plus the necessary interface lines. A fixed subscriber apparatus can be connected to the network element 11 through the input unit 16, which advantageously is a special subscriber interface card, for example. The connection of multiple fixed subscriber apparatus 21 to the network element 11 may be realized e.g. in such a manner that there is one subscriber interface card per each fixed subscriber apparatus 21. The connection may also be realized such that all fixed subscriber apparatus 21 are connected to the network element 11 through one subscriber interface card. Other solutions, too, can be advantageously used for connecting the subscriber apparatus to the network element 11. In this embodiment the network element 11 realizes the functions required by the subscriber apparatus 21, such as e.g. off-hook and on-hook detection, generation of ringing signal and other necessary functions. Fixed subscriber apparatus 21 are identified in some known manner, e.g. based on the signal line via which the signals of the subscriber apparatus come to the network element. Subscriber apparatus identification may also be realized e.g. by means of signaling, examples of which will be given later on.

FIG. 2 also shows a small portion of the host network and its various elements 92, 93, 94, 90'. In this example the host network comprises elements typical of a mobile network, such as base stations 92, base station controllers 93 controlling one or more base stations, and mobile switching centers 94. FIG. 2 also shows mobile stations 91 connected via radio links to the base stations 92 and the rest of the host network 90'. In the example of FIG. 2 the network element 11 is connected to a mobile switching center 94, realizing the functionality according to the interface between a mobile switching center and base station controller. To the host network the network element 11 thus looks like a base station controller. In this kind of an embodiment the output unit 13 realizes the functionality required by the transmission line between the network element and mobile switching center. In a GSM network this interface 95a between the mobile switching center (MSC) and base station controller (BSC) is called the A interface. In the case of a UMTS network the corresponding interface is called the Iu interface.

In a system according to FIG. 2, placing a call to the subscriber apparatus 21 may according to a preferred embodiment of the invention be carried out e.g. as follows:

Let the communications network 90' be a GSM network connected to a conventional telephone network. When a call from the conventional telephone network arrives in the GSM network it is directed to that MSC in the GSM network in the area of which the subscriber apparatus 21 has been registered. Said MSC detects that the subscriber apparatus is registered to be located in the area of the BSC emulated by the network element 11. So the MSC sends a paging message to the network element 11, which responds to the MSC using a page response message according to the A interface. The network element converts the IMSI code mentioned in the paging message into its own identifier, i.e. performs the necessary identity conversion which in the example of FIG. 2 corresponds to detecting the subscriber line that corresponds to the IMSI code. After that the network element generates the ringing signal for the subscriber line in question. As the user answers the call the network element starts converting speech signals between the subscriber apparatus and the GSM network. When the call is being established the MSC typically verifies, using an authentication procedure, that the terminal in question is the correct terminal. In such a case the network element 11 emulates the operation of the terminal using its subscriber data.

In a preferred embodiment of the invention not all subscriber data that cannot be obtained from subscriber apparatus 21 are stored in a database 15, but at least part of said data are automatically generated as it is needed. This way it is possible to reduce the amount of data stored in the database. The data may be automatically generated e.g. on the basis of some constant information, such as the subscriber's phone number, so that if the method of generation remains the same, the data generated automatically will always be the same, too. Thus it is possible to produce e.g. a fixed piece of information associated with the subscriber data, say, identification information for a terminal. If the information required need not remain constant every time, it may also be generated on the basis of the time of day or randomly, for example.

If some data, such as e.g. certain security parameters, cannot be removed from the SIM card, such data have to be copied from the SIM card to the network element. In that case the network will preferably verify according to security requirements that only one piece of the information is actually used.

Figure 3:
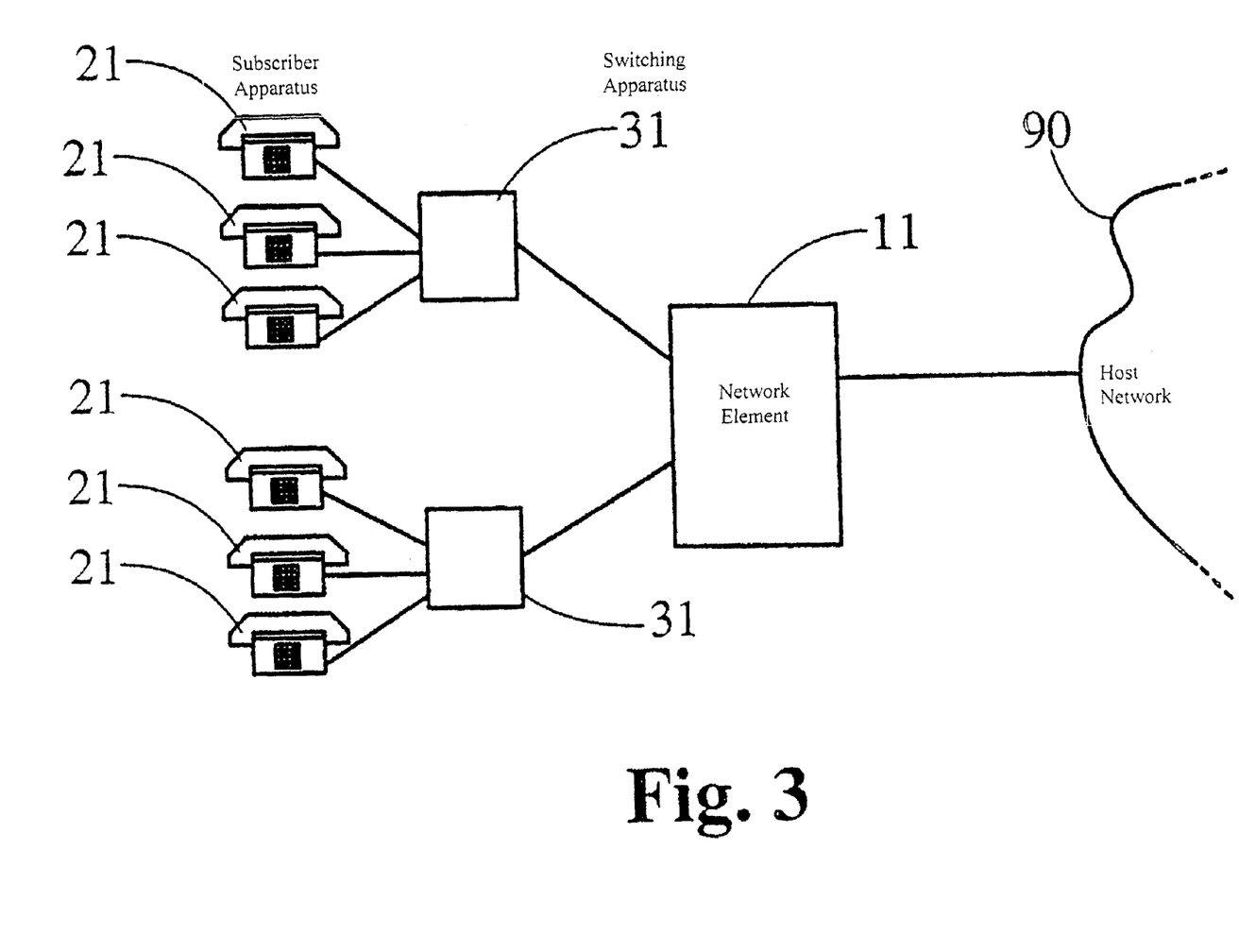
FIG. 3 shows an embodiment of the network element according to the invention, wherein switching centers of a fixed telephone network are connected to the input side of the network element.

In a preferred embodiment of the invention the network element 11 may be connected to a switching apparatus or a corresponding element in a local exchange. FIG. 3 shows such an arrangement in which the network element 11 is functionally connected to a switching apparatus 31 in a local telephone network. It is possible to connect in the manner shown in FIG. 3 more than one switching apparatus 31 to the network element 11 either directly, as shown in FIG. 3, or through other switching apparatus. In this kind of an embodiment the identification of the subscriber apparatus may be realized e.g. by means of signaling used by the switching apparatus 31.

Examples of such signaling methods are the ISUP, SS7, and R2 signaling protocols used in the conventional telephone network. In this kind of an embodiment the network element 11 emulates to the switching apparatus the desired interface known to the switching apparatus or e.g. another switching apparatus. FIG. 3 also shows the host network 90.

Figure 4:
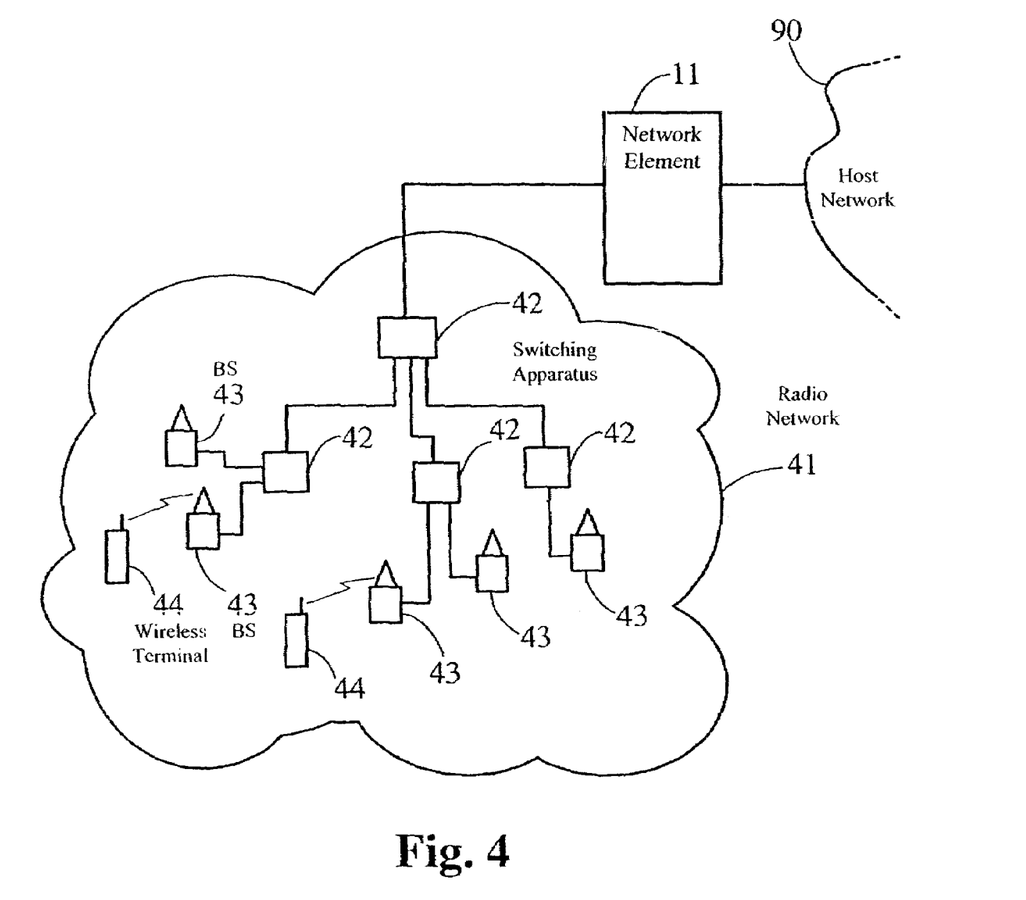
FIG. 4 shows an embodiment of the network element according to the invention, wherein a radio network is connected to the input side.

FIG. 4 illustrates a preferred embodiment of the invention in which a radio network 41 is connected to the host network through the network element 11. The radio network 41 may be e.g. a company's internal radio communication network or a wireless interphone network. In the example depicted in FIG. 4 the radio network 41 includes base stations 43 and switching apparatus 42 of the radio network. The radio network 41 further includes wireless terminals 44 connected to the rest of the radio network 41 via base stations 43. In this kind of an embodiment the wireless terminals 44 correspond to the subscriber apparatus 21 of the examples described above, so that the network element realizes the emulation towards the host network on the basis of the wireless terminal identification data and host network subscription data stored in its memory. In this kind of an embodiment the network element 11 realizes the desired radio network 41 interface functionality towards the radio network 41.

For example in the case of a wireless interphone system, such as a DECT system, the network element 11 may emulate a switching apparatus of a conventional telephone system towards the DECT system 41, so that as far as the DECT system is concerned the situation is the same as in the prior art where the DECT system is connected to a switching center of a fixed telephone network, say, the switching center of a company or building.

Generally, the inventional network element can be used to emulate functions of terminals, such as mobile communication devices, in the host network, which functions are not provided by the terminals of the system connected to the host network. Particularly the network element can be used to emulate functions requiring processing, which the terminals of said system cannot realize e.g. because they do not have a processor, their processing capacity is too small for realizing the functions in question, or it is impossible to store in the terminal the subscriber data needed by the host network. So, the emulation of a SIM card according to the examples above is just one advantageous example of such functions.

Above it was disclosed by way of example that the network element advantageously includes the additional information, such as e.g. the subscription data of the mobile network, which is needed in the emulation towards the host network but which cannot be obtained from the system connected to the host network. Furthermore, in some embodiments it may be possible that the host network does not provide all the data and services needed by the system connected to the host network. In that case the network element emulates the services needed by said system on the basis of the additional information stored in the network element.

Figure 5:
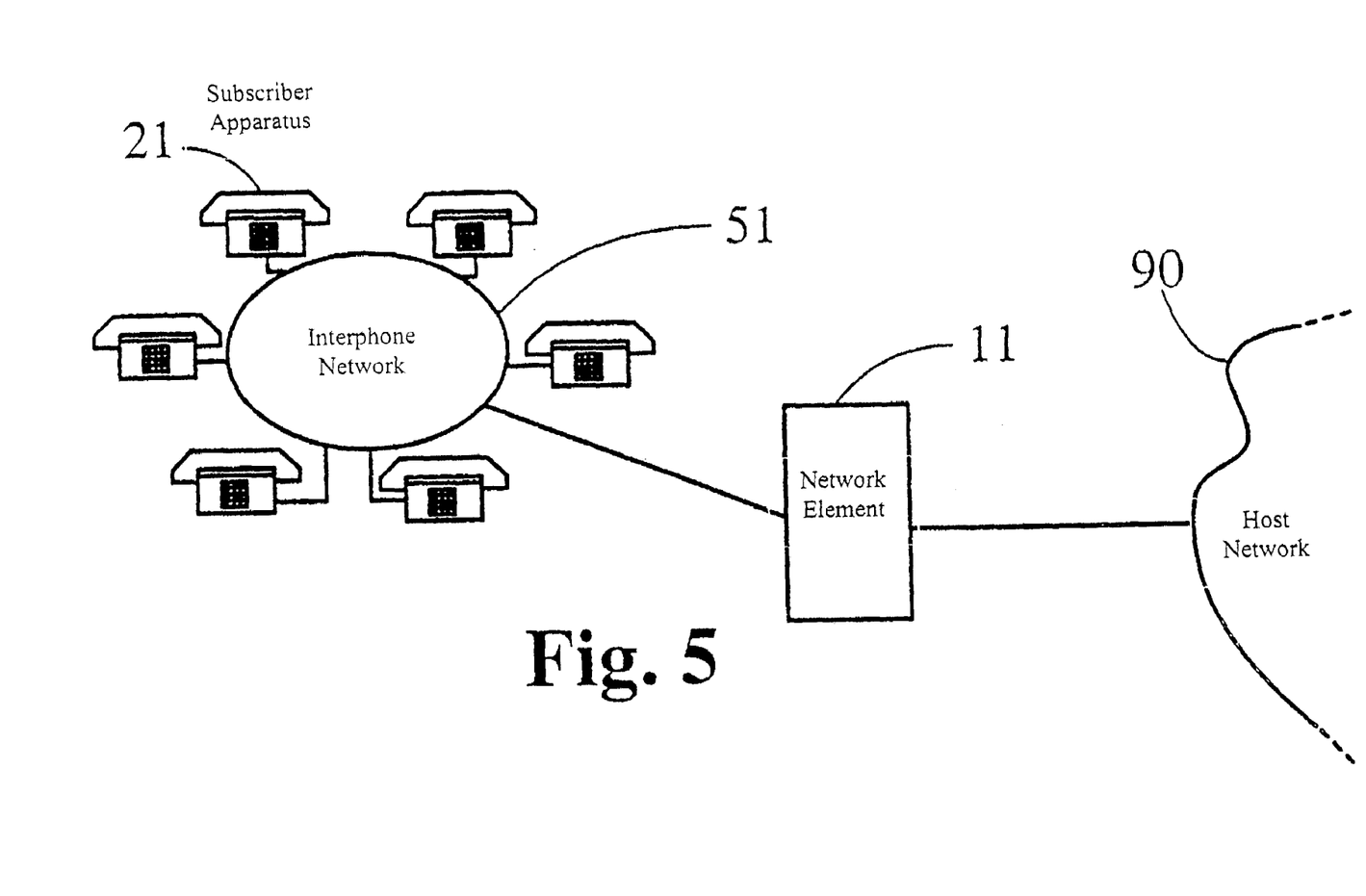
FIG. 5 shows an embodiment of the network element according to the invention, wherein an interphone network is connected to the input side.

FIG. 5 illustrates a preferred embodiment of the invention in which the network element is used to connect an interphone network 51 of, say, a company or building to the host network 90. Here the interphone network 51 may be e.g. a conventional intercom network, an Intranet network realized by means of a communications network of a company or building, a DECT network or some other interphone network. In the example of FIG. 5 the interphone network comprises several subscriber apparatus 21.

It is also possible to connect some other network, which is not mentioned above, to the input unit 16 of the network element 11. It is obvious to one skilled in the art that the network element 11 can be used to connect to the host network 90 a combination of the networks mentioned above as examples or other similar networks. The network element may realize towards the host network other interfaces than those mentioned above.

Figure 6:
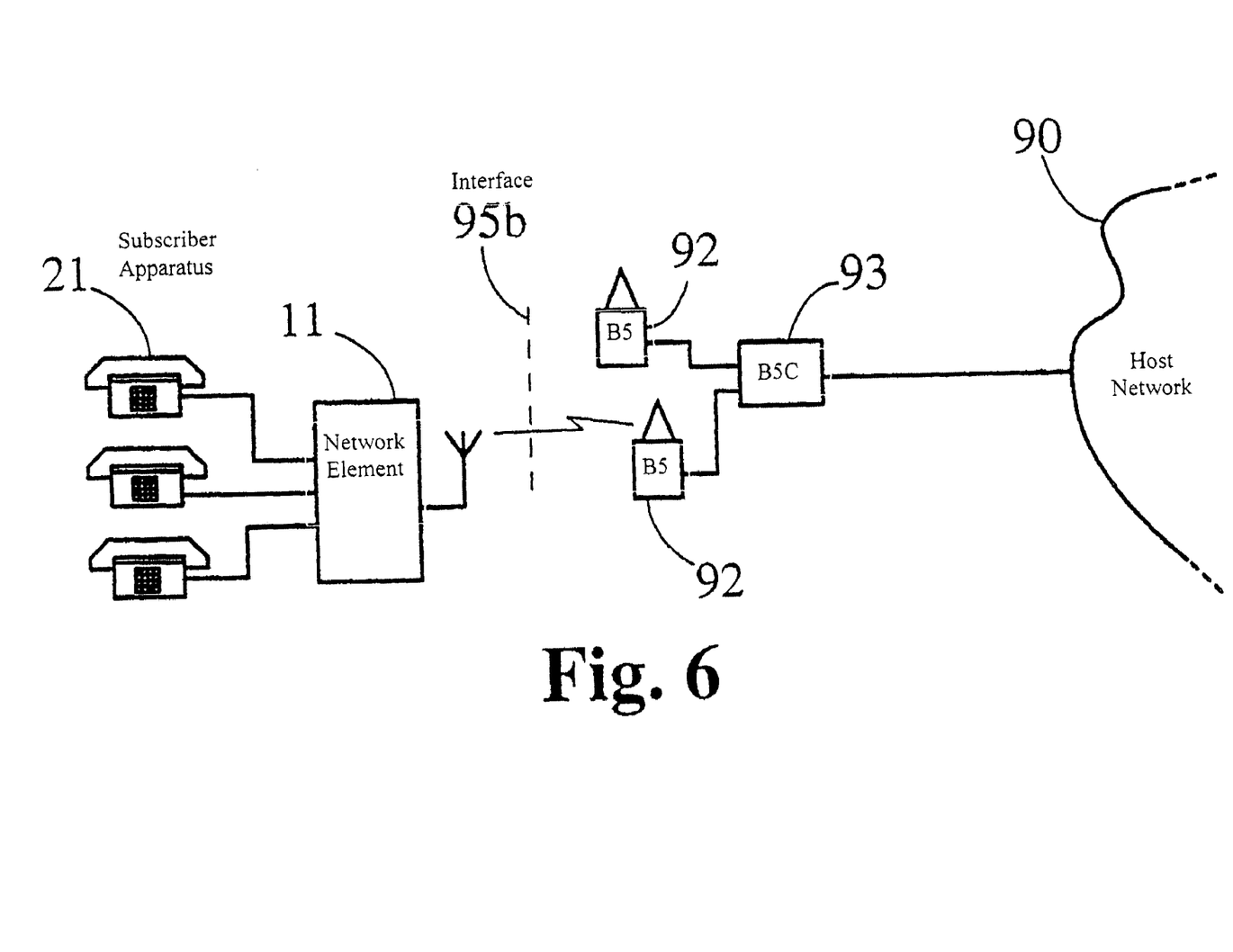
FIG. 6 shows a network element according to the invention in a mobile network wherein the network element emulates a radio interface.

The network element may realize towards the host network other interfaces then those mentioned above. FIG. 6 shows a structure according to a preferred embodiment of the invention. In FIG. 6, a plurality of subscriber apparatus 21 are connected to network element 11, and the interface between the network element 11 and host network 90 is a radio interface 95b. In this kind of an embodiment the network element emulates a number of mobile communication devices. Of the components of the host network 90, FIG. 6 shows base stations 92 and a base station controller 93. In this kind of an embodiment the network element comprises a transmitter unit to which the necessary antenna equipment is connected. Such a transmitter unit can be realized e.g. in the output unit 13.

Figure 7:
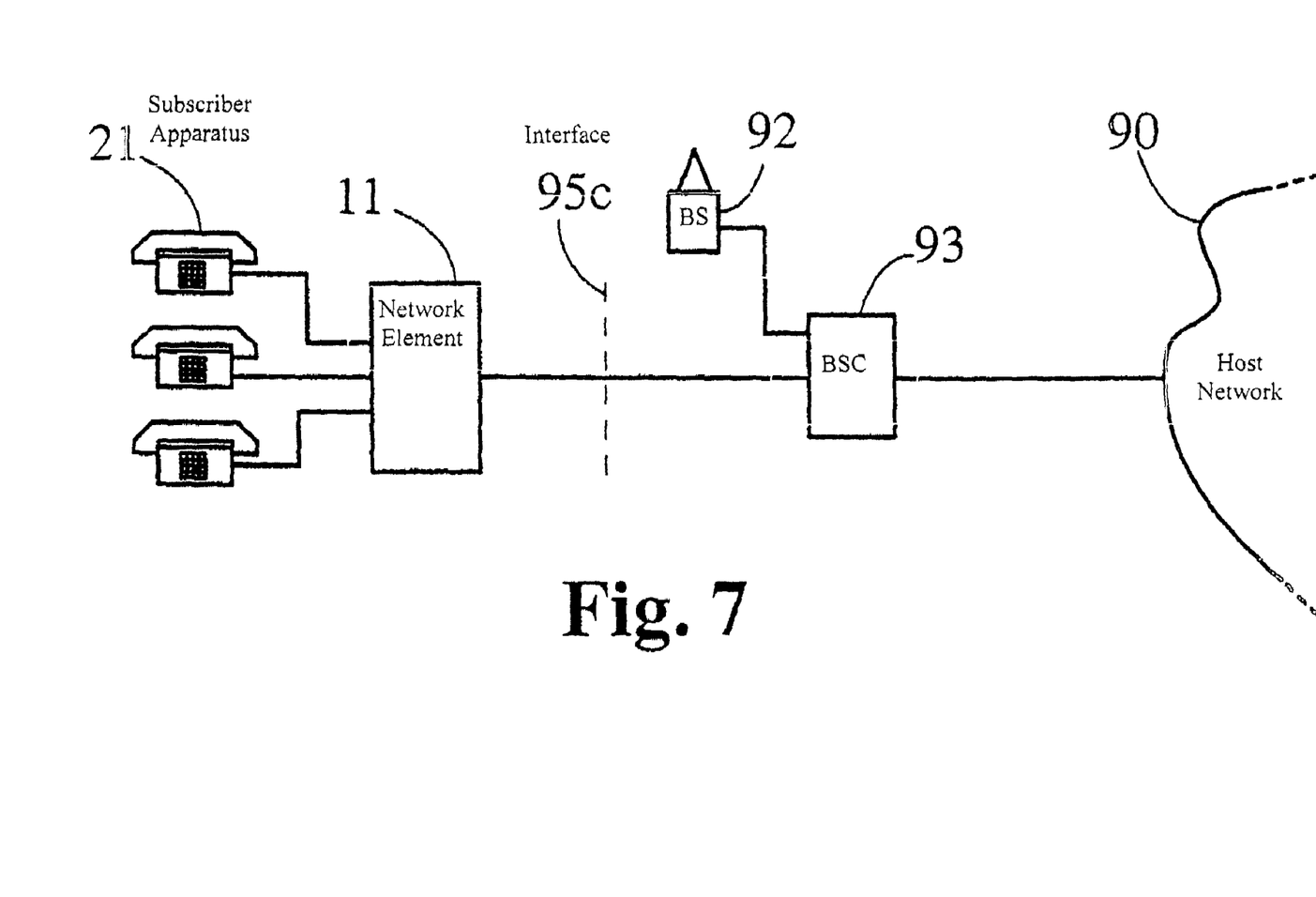
FIG. 7 shows a network element according to the invention in a mobile network wherein the network element emulates an interface between a base station and base station controller.

FIG. 7 shows a structure according to a preferred embodiment of the invention. In FIG. 7, the network element 11 realizes an interface 95c similar to that between a base station and base station controller 93 so that as far as the host network is concerned, the network element 11 functions as a base station. In an embodiment in which the host network is a GSM network, the interface 95c is an Abis interface. In an embodiment in which the host network is a UMTS network, the interface 95c is an Iub interface.

The network element 11 may comprise other elements than those mentioned in the examples above. Such elements include e.g. elements intended for the adaptation of transmission rates, needed when the network element 11 is placed between two networks using different transmission rates. Other necessary adaptation elements may also be included in the network element 11.

Above it was disclosed by way of example that the signals connected by means of the network element are speech signals. The invention is not, however, limited to this. For example, if both the host network and the system connected to the host network support other types of communications connections, the signals connected may be signals containing other types of data as well.

The name of a given functional unit, such as a base station controller, is often different in different mobile communication systems. For example, the nearest equivalent in the UMTS to the base station controller (BSC) of the GSM system is, according to some specifications, the radio network controller (RNC). In the claims attached hereto the terms base station controller and mobile switching center are not in any way restricted to refer only to the elements of the GSM system, but the terms cover the functionally equivalent elements of other mobile communication systems as well. In the claims attached hereto the term subscriber apparatus refers to the appropriate apparatus in the system to be connected, such as e.g. a conventional phone in a fixed telephone network, a terminal of a wireless interphone network or a corresponding apparatus.

Above the invention was described referring to some of its preferred embodiments but it is obvious that the invention may be modified in many different ways in accordance with the inventional idea defined by the claims attached hereto.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system comprising:
    a subscriber apparatus of a user arranged to connect to a host mobile network,
    means for storing, in a network element connected to the host mobile network, subscriber data corresponding to information concerning the subscriber apparatus of the user of the subscriber system, said network element being arranged to associate the subscriber apparatus of the user with a mobile communication means of the user on the host mobile network;
    means for transporting a user's subscriber identity to the network element; means for realizing emulation of network functions towards said host mobile network and towards said subscriber system based on at least one of said user's subscriber identity and said stored subscriber data;
    means for emulating towards said host mobile network a first desired interface by producing first signals representing signals of the host mobile network in said network element, said host mobile network including said first desired interface;
    means for emulating towards said subscriber system a second desired interface by producing second signals representing signals of the subscriber system in said network element, said subscriber system including said second desired interface; and
    means for connecting, in said network element, said second signals to the host mobile network and said first signals to said subscriber system based on said stored subscriber data.

2. The system according to claim 1, wherein said network element is arranged to be used to emulate mobile network functions associated with mobile communication devices of the host mobile network that are not realized by the subscriber apparatus in said subscriber system.

3. The system according to claim 2, wherein at least a part of said functions are functions dependent on said subscriber data.

4. The system according to claim 1, wherein the network element is used to receive signals from said subscriber system, which signals are coming from signal lines of which there are a certain first number, and said received signals are concentrated into signal lines of the host mobile network of which there are a certain second number such that said second number is smaller than said first number.

5. The system according to claim 1, wherein said first desired interface is an interface between a base station controller and a mobile switching center.

6. The system according to claim 1, wherein said first desired interface is an interface between a base station controller and a base station.

7. The system according to claim 1, wherein said first desired interface is a radio interface between a mobile communication device and a base station.

8. The system according to claim 1, wherein at least part of host mobile network subscriber information needed by the network element is read from a database stored in the network element.

9. The system according to claim 1, wherein at least part of host mobile network subscriber information needed by the network element is generated automatically.

10. The system according to claim 1, wherein said subscriber system comprises at least one fixed telephone network.

11. The system according to claim 1, wherein said subscriber system comprises at least one radio network.

12. The system according to claim 1, wherein said subscriber system comprises at least one interphone network.

13. A network element for connecting to a host mobile network with a subscriber apparatus of a subscriber system, comprising:
    memory means for storing subscriber data corresponding to information concerning the subscriber apparatus of a user of the subscriber system, said network element associates the subscriber apparatus of the user with a mobile communication means of the user on the host mobile network;
    means of signaling for transporting a user's subscriber identity to the network element, emulation means for emulating a desired interface of network functions towards said host mobile network and towards said subscriber system based on at least one of said user's subscriber identity and said stored subscriber data, input means and output means for providing signals of the desired interface towards said host mobile network and towards said subscriber system; and switching means for connecting signals of said subscriber system to the host mobile network and signals of the host mobile network to said subscriber system based on said stored subscriber data.

14. The network element according to claim 13, wherein said emulation means are arranged so as to emulate mobile network functions associated with mobile communication devices of the host mobile network which are not provided by said subscriber apparatus in said subscriber system.

15. The network element according to claim 13, wherein the output means realizes functionality according to a predetermined interface of said host mobile network.

16. The network element according to claim 15, wherein said predetermined interface is an interface between a base station controller and a mobile switching center.

17. The network element according to claim 15, wherein said predetermined interface is an interface between a base station and a base station controller.

18. The network element according to claim 15, wherein said predetermined interface is an interface between a mobile communication device and a base station.

19. The network element according to claim 13, wherein said memory means comprises a database block for storing host mobile network subscription data corresponding to the subscriber apparatus in said subscriber system.

20. The network element according to claim 13, wherein said subscriber data corresponds to information in a subscriber identity module (SIM) of the mobile communication means of the user on the mobile network.

21. A network element for connecting to a host mobile network with a subscriber apparatus of a subscriber system, comprising:

memory means for storing subscriber data corresponding to information concerning the subscriber apparatus of a user of the subscriber system, said network element associates the subscriber apparatus of the user with a mobile communication means of the user on the host mobile network;

means for receiving a user's subscriber identity in the network element;

emulation means for emulating a desired interface of network functions towards said host mobile network and towards said subscriber system based on at least one of said user's subscriber identity and said stored subscriber data, input means and output means for providing signals of the desired interface towards said host mobile network and towards said subscriber system; and switching means for connecting signals of said subscriber system to the host mobile network and signals of the host mobile network to said subscriber system based on said stored subscriber data.

22. A network element for connecting to a host mobile network with a subscriber apparatus of a subscriber system, comprising:

memory for storing subscriber data corresponding to information concerning the subscriber apparatus of a user of the subscriber system, said the network element associates the subscriber apparatus of the user with a mobile communication means of the user on the host mobile network;

a receiver arranged to receive a user's subscriber identity in the network element;

an emulation block for emulating a desired interface of network functions towards said host mobile network and towards said subscriber system based on at least one of said user's subscriber identity and said stored subscriber data;

an input unit and an output unit for providing signals of the desired interface towards said host mobile network and towards said subscriber system; and a switching block for connecting signals of said subscriber system to the host mobile network and signals of the host mobile network to said subscriber system based on said stored subscriber data.

* * * * *